United States Patent [19]
Tjaden et al.

[11] Patent Number: 5,246,077
[45] Date of Patent: Sep. 21, 1993

[54] THREE-POINT HITCH GUIDANCE CONTROL

[76] Inventors: Larry E. Tjaden, Rte. 2; Leonard E. Tjaden, R.R. 4, both of Charles City, Iowa 50616

[21] Appl. No.: 803,546

[22] Filed: Dec. 9, 1991

[51] Int. Cl.$^5$ ............................................. A01B 63/118
[52] U.S. Cl. ........................................ 172/450; 172/5; 171/9; 104/244.1
[58] Field of Search ................. 172/5, 6, 26, 272, 450; 171/9; 104/244.1; 56/10.2; 280/412, 413, 479.1

[56] References Cited

U.S. PATENT DOCUMENTS

| | | | |
|---|---|---|---|
| 2,727,756 | 12/1955 | Carlile | 172/450 X |
| 3,425,715 | 2/1969 | Weitz | 172/450 X |
| 4,821,807 | 4/1989 | Trumm | 172/446 X |
| 4,930,581 | 6/1990 | Fleischer et al. | 172/6 |

FOREIGN PATENT DOCUMENTS

| | | | |
|---|---|---|---|
| 247922 | 3/1963 | Australia | 172/450 |
| 259283 | 4/1967 | Austria | 172/450 |
| 315594 | 5/1989 | European Pat. Off. | 172/450 |
| 2939987 | 4/1980 | Fed. Rep. of Germany | 172/5 |
| 1253132 | 12/1960 | France | 172/6 |
| 411793 | 10/1974 | U.S.S.R. | 172/5 |

OTHER PUBLICATIONS

Orthman Manufacturing, Inc. brochure entitled "Computerized Quick Hitch Guidance System".

*Primary Examiner*—Dennis L. Taylor
*Assistant Examiner*—Spencer Warnick
*Attorney, Agent, or Firm*—G. Brian Pingel

[57] ABSTRACT

A horizontal guidance control system for a standard three point tractor hitch is disclosed. The system employs the use of a manual control element which actuates a pair of hydraulic cylinders contained in a pair of hydraulic adjusters. The control element causes the extension of one cylinder and the retraction of the other cylinder, thereby causing controlled horizontal movement of a pair of pull links of the tractor hitch.

7 Claims, 4 Drawing Sheets

THREE-POINT HITCH GUIDANCE CONTROL

BACKGROUND OF THE INVENTION

1. Field of the Invention

The present invention relates in general to a guidance control for an agricultural implement pulled by a tractor and more specifically relates to a guidance control that operates in association with the three point hitch of the tractor to provide a positive control for horizontal movement of the hitch.

2. Description of the Prior Art

The present invention is adapted to be utilized with the three point hitch of a tractor to control the travel of an agricultural implement pulled by the tractor through a field of row crops. Under such circumstances, it is highly important that the implement be positioned relative to the rows so that destruction of the crop does not result.

Until recently, guidance of such implements was controlled solely by the operator of the tractor guiding the tractor wheels with respect to the crop rows in front of him and relying upon the fact that normally the implement will be following the tractor in a proper position with respect to the crop rows. This means that the tractor operator must be conscious at all times of the relationship of the tractor to the crop rows and skillful and conscientious driving is required to maintain proper steering of the tractor.

In recent years, guidance systems have been developed to properly position an implement with respect to the crop rows even though the tractor which it follows may be improperly positioned thereto. Fleischer et al. U.S. Pat. No. 4,930,581 is an example of one such guidance system. The Fleischer et al. patent discloses the use of a control hitch mounted to a conventional three point tractor hitch and positioned between the hitch and the tool bar of an implement which is rotatably mounted to the control hitch. Sensing devices are associated with the implement for activating hydraulic circuitry that causes rotation of the implement with respect to the control hitch to properly position the implement relative to rows of crops. Another type of guidance system that is known in the art is manufactured and sold by Orthman Manufacturing, Inc. and involves a somewhat rectangularly shaped frame type structure, the movement of which is controlled by a programmable microprocessor based controller to move the pull links of a three point hitch from side to side.

Although the above systems appear to provide improved performance for guidance of an implement following a tractor, such systems are unnecessarily complicated and relatively expensive to manufacture. Furthermore, they cannot be manually activated to control horizontal movement of a three point hitch. In contrast to the prior art devices, the present invention provides a relatively simplistic means for manually or automatically efficiently and conveniently controlling the horizontal movement of a three point hitch.

SUMMARY OF THE INVENTION

The present invention provides a horizontal guidance control for a three-point hitch attached to the chassis of a tractor. As part of the hitch, a pair of pull links are universally connected to the tractor chassis and allow for both horizontal and vertical movement of the hitch. Guidance of the horizontal movement of the pull links is provided by a pair of force means in the form of hydraulic adjusters which employ hydraulic cylinders.

The hydraulic adjusters preferably are each formed of at least two lever arms pivotally connected together at one end and positioned between an associated pull link and the tractor chassis, and a hydraulic cylinder mounted on one of the lever arms and having a cylinder rod attached to the other lever arm for adjustment of the lever member upon actuation of the cylinder to guide the pull links of the hitch. A manual control means is utilized to actuate the hydraulic adjusters and cause either the expansion or retraction of the adjusters necessary to the desired alignment of the pull links. This is an important aspect of the invention because it provides a positive control of the horizontal movement of the hitch which is particularly helpful in aligning the hitch for attachment to an implement to be pulled by the tractor. Also, when an implement is attached to the hitch the guidance control maintains the implement in a proper position. As the implement is pulled through row crops, an automatic control means is utilized for actuation of the hydraulic adjusters to properly position the implement with respect to the crop rows.

DETAILED DESCRIPTION OF THE PREFERRED EMBODIMENT

Figure 1:
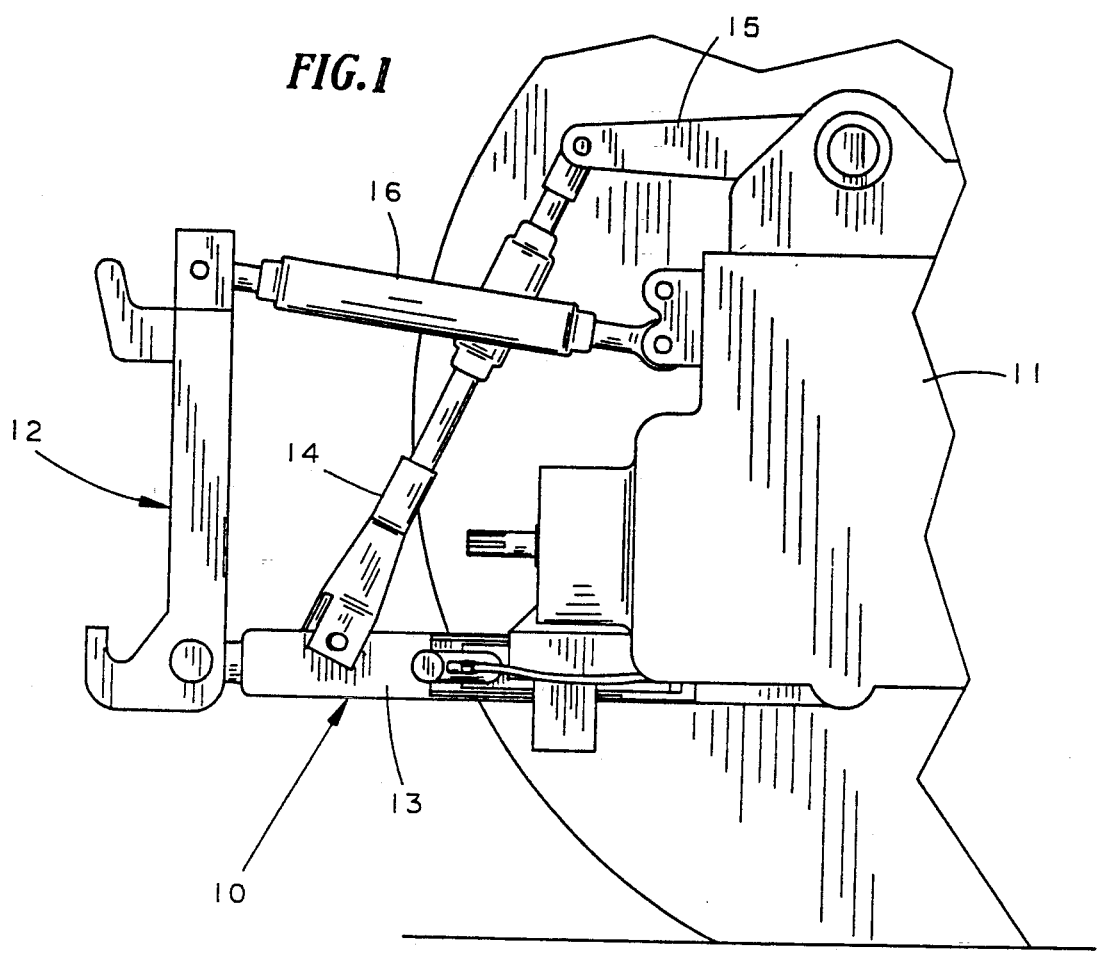
FIG. 1 is a fragmentary side view of one side of a standard type three point hitch attached to the rear portion of a tractor.

Starting at FIG. 1, one side of a standard type three point hitch 10 is shown mounted on the chassis of a tractor 11 and pivotally connected to a quick hitch or tow bar 12 or an implement (not shown). The three point hitch 10 includes a horizontally aligned pull link 13 and a vertically inclined lift arm 14 on each side of the tractor 11. Each lift arm 14 is pivotally connected at its lower end to an associated pull link 13 and is pivotally connected at its upper end to an upper lever arm 15. FIG. 1 also shows a central pull link 16 pivotally connected at its inner end to the tractor 11 and pivotally connected at its outer end to the implement quick hitch or tow bar 12. The opposite side of said hitch 10 is comprised, as it is well-known in the art, in a similar, mirror-type fashion as is the side depicted in FIG. 1 and similar numbers have been assigned to the similar elements of each side.

Figure 5:
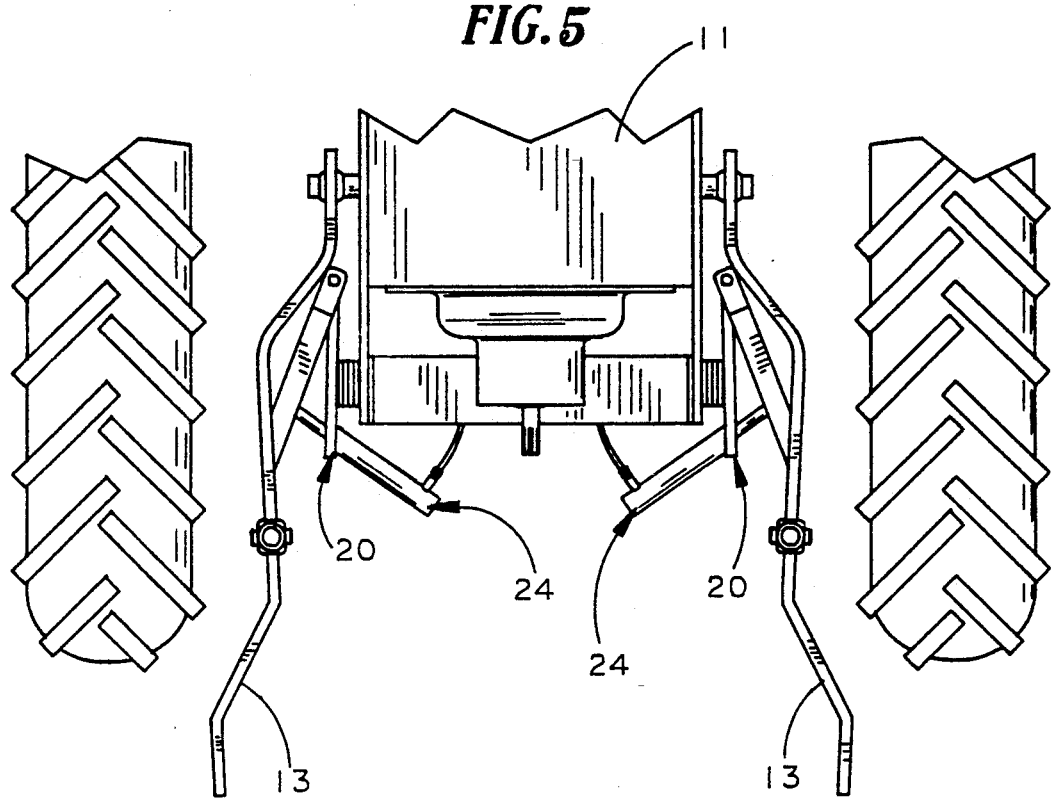
FIGS. 5, 6, and 7 are plan views of said hitch and said tractor of FIG. 1 shown in association with two of the adjusters of FIG. 2 which are actuated to position said hitch in straight forward, left, and right alignments, respectively.
Figure 6:
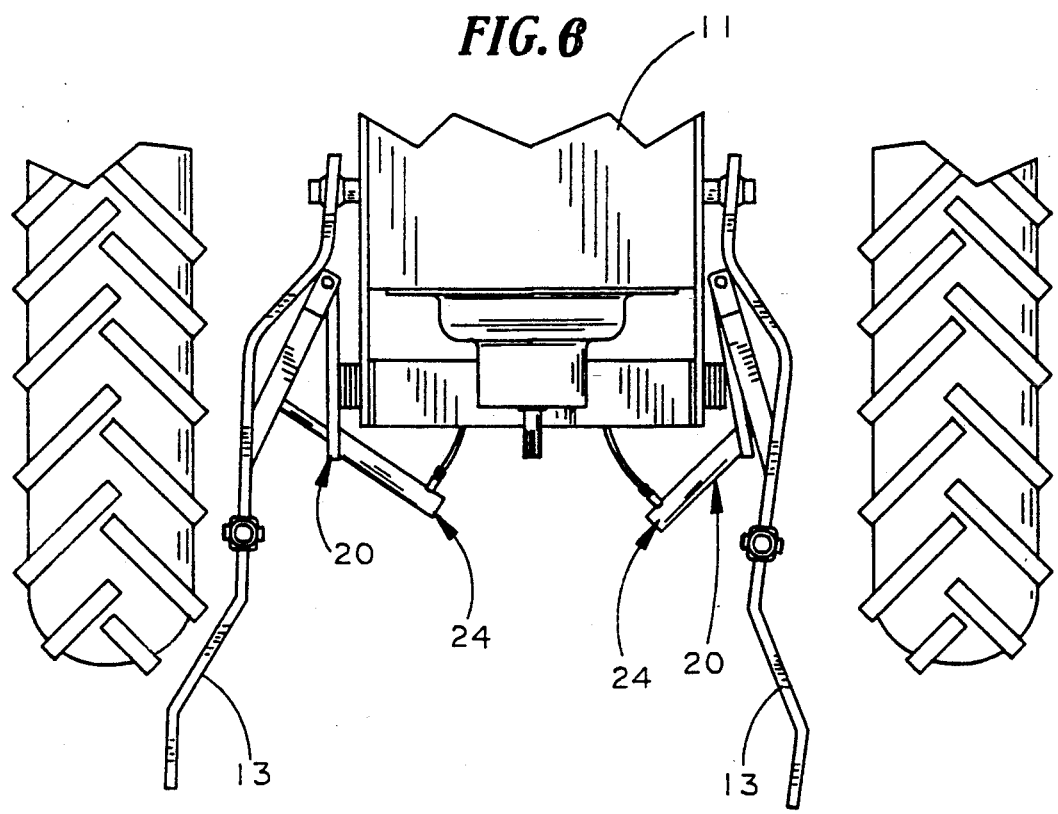
Figure 7:
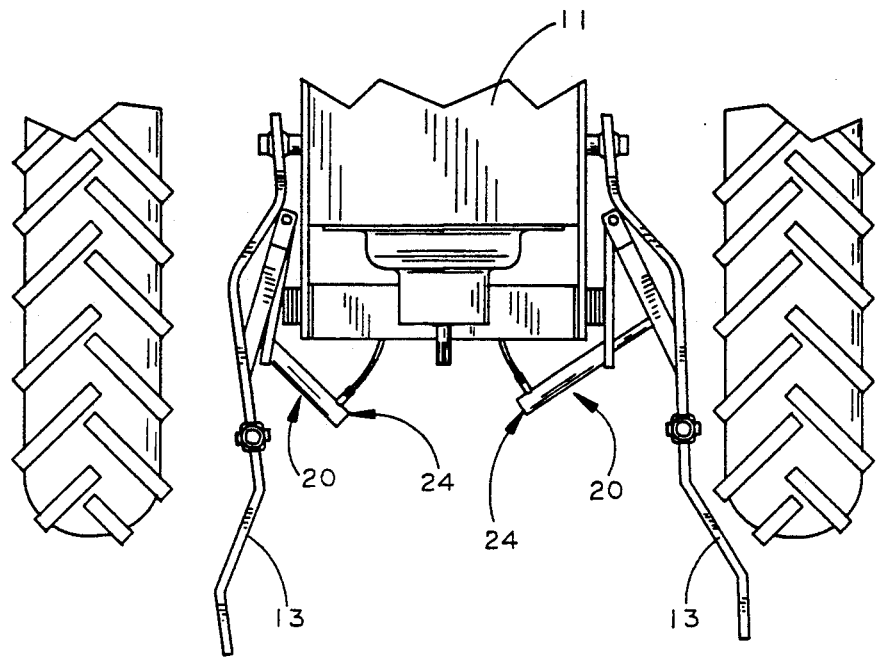
Figure 8:
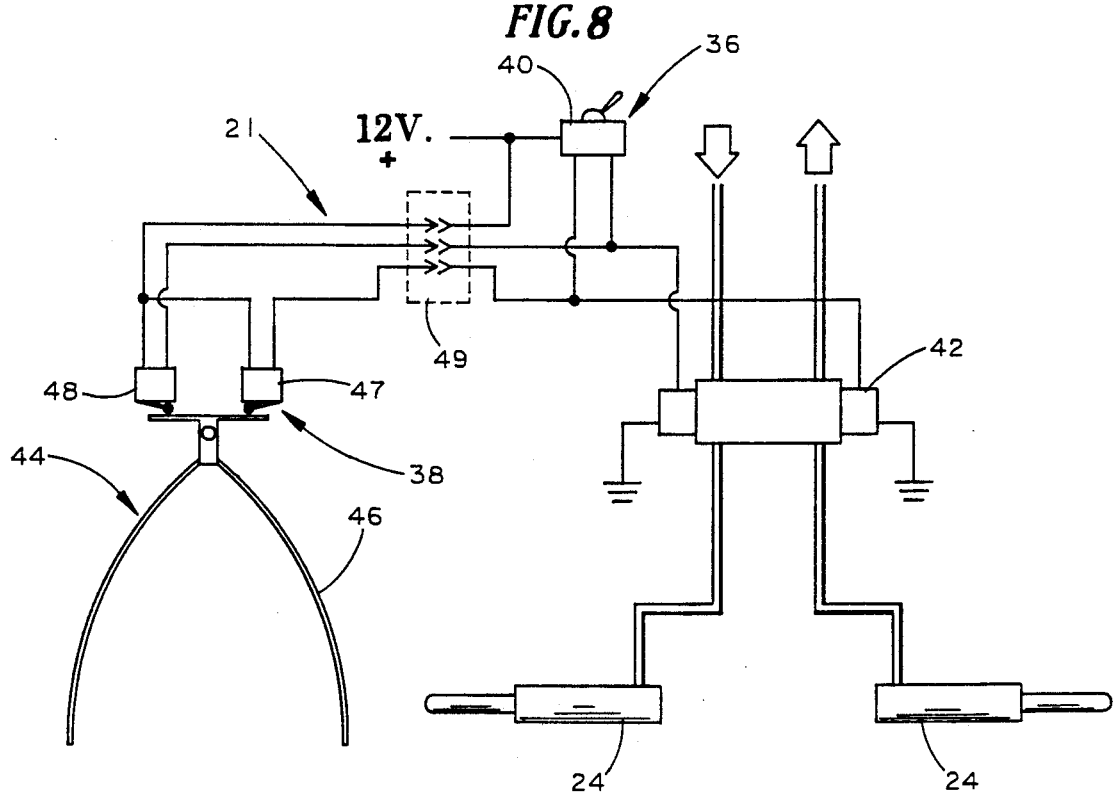
FIG. 8 is a schematic diagram of an electrical circuit utilized in the preferred embodiment of the present invention and including manual and automatic control means.

The present invention is adapted to provide a horizontal guidance control for the three point hitch 10 so that the pull links 13 of the hitch can be controlled to move simultaneously in a sidewardly direction to facilitate attachment of the hitch to an implement or the like. In addition, the guidance control can be actuated by means of a crop sensor positioned on an implement attached to the hitch 10 so as to control the hitch to maintain the implement in a proper relationship to the crop being sensed. The guidance control of the present invention is preferably formed of two hydraulic adjusters 20, as shown in FIGS. 5-7, and an electronic circuit 21, as shown in FIG. 8, for controlling the adjusters 20. The hydraulic adjusters 20 serve as force means to provide controlled horizontal movement for each of the pull links 13.

Figure 2:
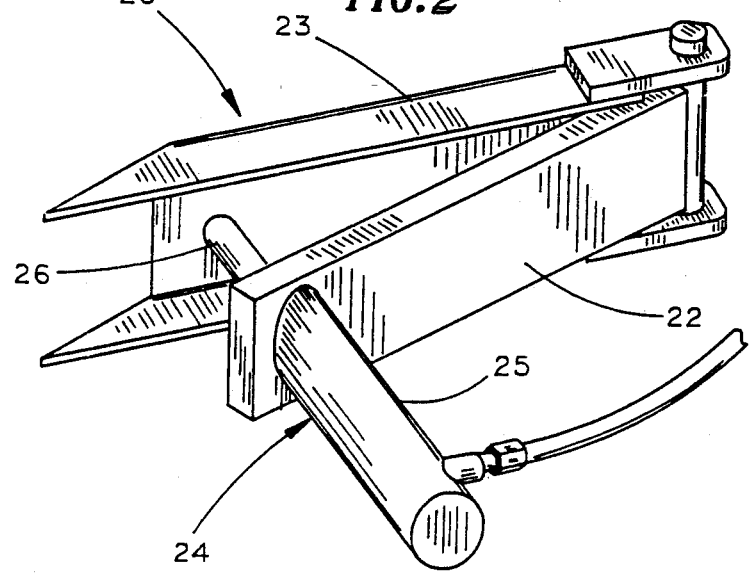
FIG. 2 is a perspective view of a hydraulic adjuster that forms a portion of the preferred embodiment of the guidance control of the present invention.

Referring now to FIG. 2, each of the hydraulic adjusters 20 has an inner lever arm 22 and an outer lever arm 23 pivotally connected to each other at their respective frontward ends. Preferably, the outer arm 23 is channel shaped thereby allowing said inner arm 22, which is bar shaped, to fit within the outer arm 23 when the adjuster 20 is in a closed position. Each adjuster 20 also has a single ram hydraulic cylinder 24 with a cylinder chamber 25 secured at its open end in the rearward end of the inner arm 22. A cylinder rod 26, telescopically located within said chamber 25, freely passes through said inner arm 22 and presses against, or contacts the rearward end of the outer arm 23 to thereby allow the hydraulic cylinder 24 to open and close the lever arms 22 and 23.

Figure 3:
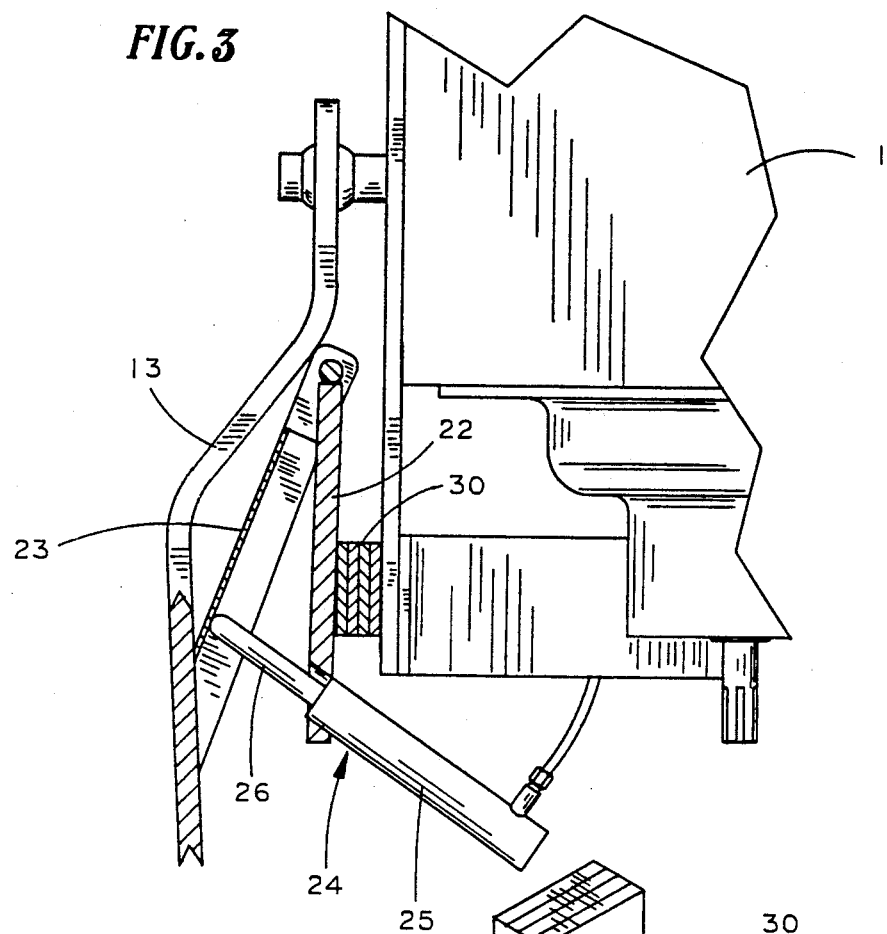
FIG. 3 is a plan view of the hitch shown in FIG. 1 in association with the hydraulic adjuster of FIG. 2.
Figure 4:
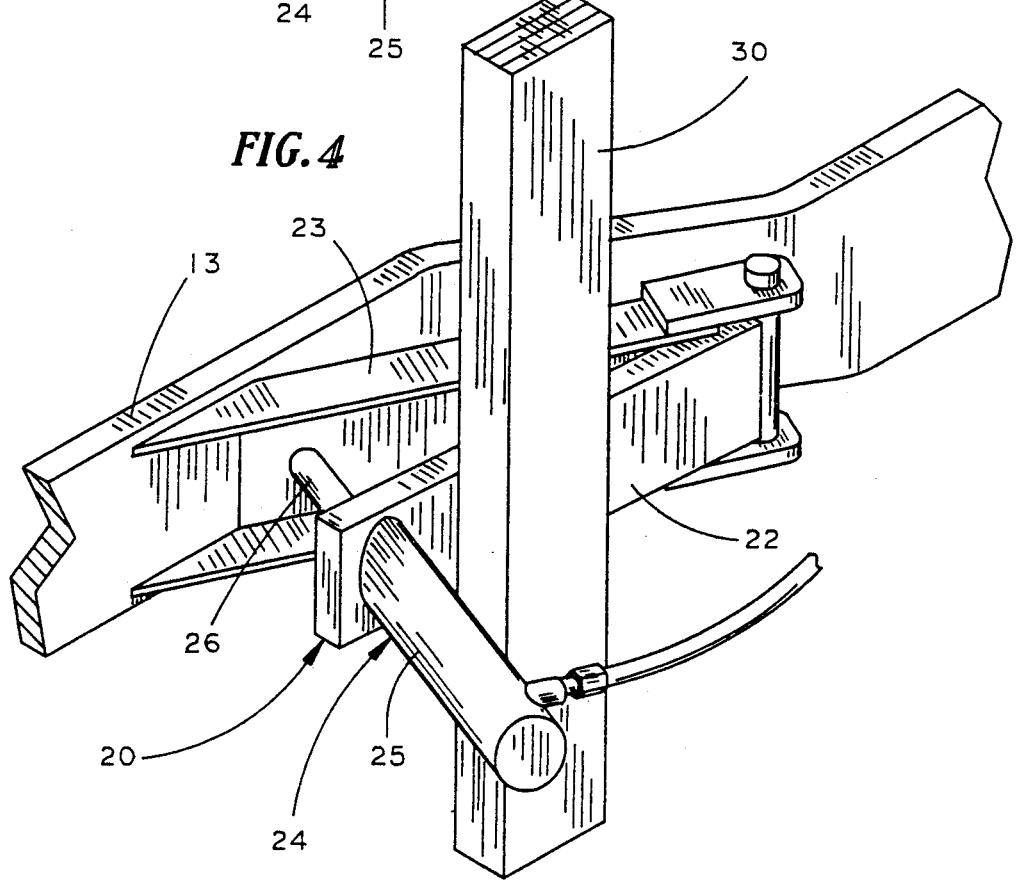
FIG. 4 is a perspective view of said adjuster of FIG. 2 located between a pull link of the hitch of FIG. 1 and a spacer bar.

One of the hydraulic adjusters 20 is positioned on each side of the hitch 10 between the chassis of the tractor 11 and one of the pull links 13. As illustrated by FIG. 3, one of the pull links 13 is shown universally connected to the side of said tractor 11 and in association with one of the adjusters 20. The outer arm 23 of the adjuster 20 has both its ends connected to the inner side of said pull link 13. The inner side of the adjuster inner arm 22 abuts against a spacer bar or sway block 30 that is vertically secured to the side of the tractor 11. The thickness of the sway block or spacer bar 30 must be sized according to the amount of horizontal movement desired at the rear end of the pull link 13. Said spacer bar 30 acts as an abutment member to provide both vertical and horizontal stabilization for the adjuster inner arm 22, as shown in FIG. 4, when the hitch 10 moves either vertically or horizontally.

FIGS. 5, 6, and 7 depict the hitch 10 positioned in a straight forward, left, and right alignments, respectively. Through these figures, it should be noted that when one of said hydraulic adjusters 21 is extended, the opposite hydraulic adjuster 21 is retracted correspondingly. Therefore, said pull links 13 remain separated by the same horizontal distance throughout any horizontal or vertical movement of said hitch 10.

As mentioned above, FIG. 8 shows the electronic circuit 21 that is employed to control actuation of the hydraulic adjuster cylinders 24. Preferably, the circuit 21 includes a manual control means 36, an automatic control means 38 and an on/off switch (not shown). The manual control means 36 is formed of a toggle switch 40 that controls the activation of a hydraulic control valve 42 to extend or retract the hydraulic cylinders 24. The automatic control means 38 is formed of a sensing means 44 that includes a sensing wand 46 and a pair of microswitches 47 and 48. The automatic control means is employed when an implement is attached to the hitch 10 to be pulled behind the tractor 11. The sensing wand 46 and the microswitches 47 and 48 are mounted on the implement and an electrical connector 49 is employed for connecting the automatic control means 38 with the manual control means 36.

In operation, the sensing wand 46 is attached to the implement so as to come into contact with a crop row to be sensed when the implement begins moving out of a desired position with respect to the crop row. Upon such sensing, either the microswitch 47 or 48 will be activated, as is well-known in the art, to actuate the hydraulic cylinders 24 and thereby correct the alignment of the implement with respect to the crop.

Thus, the present invention provides a relatively simplistic and yet highly efficient method for controlling the positioning of the pull links of a three point tractor hitch to facilitate attachment of the hitch to an implement, or for properly positioning an implement being pulled by the tractor through a field. Although a preferred embodiment has been shown and described herein, it should be understood that many modifications can be made in such embodiment without departing from the true spirit and scope of the present invention. For example, a variety of constructions can be employed in place of the pivotally connected lever arms 22 and 23 to provide an adjuster unit that would serve to control movement of the pull links 13.

We claim:

1. A horizontal guidance control for a three-point tractor hitch attached to the chassis of a tractor and having a pair of pull links universally connected to said chassis, said guidance control comprising:
    (a) force means positioned between said tractor chassis and said pull links, and being actuable to move said pull links simultaneously in a horizontal direction;
    (b) control means for actuating said force means to horizontally position said pull links with respect to said chassis;
    (c) a vertically aligned abutment member is mounted on said tractor chassis;
    (d) said force means has a lever arm that bears against said vertically aligned abutment member on said tractor chassis and includes a hydraulic cylinder for expanding and retracting said force means to cause the movement of said pull links, and said lever arm has one end pivotally attached to one of said pull links and an opposite end on which said cylinder is mounted.

2. A guidance control as recited in claim 1 wherein said hitch is attached to an implement and said control means includes an automatic control system having a crop sensing means mounted on said implement for sensing the directional alignment of said implement and thereby causing operation of said force means necessary to maintain a desired alignment of said implement.

3. A guidance control as recited in claim 2 wherein said control means further includes a manual control having a control switch so that when said manual control is activated it bypasses said automatic control thereby manually controlling said force means.

4. A horizontal guidance control for a three-point tractor hitch attached to the chassis of a tractor and having a pair of horizontally spaced apart pull links universally connected to said chassis, said guidance control comprising:
    (a) force means associated with each of said pull links and having:
        (1) an adjustable lever member formed of at least two lever arms pivotally connected together at one end and positioned between said associated pull link and said tractor chassis; and (2) a hydraulic cylinder mounted on arms and having a cylinder rod contacting the other of said lever arms to adjust the lever member upon actuation of said cylinder to move said associated pull link in a horizontal direction; and (b) control means for actuating said force means to position said pull links with respect to said chassis.

5. A guidance control as recited in claim 4 wherein said hitch is attached to an implement pulled by said tractor and said control means includes an automatic control circuit having a crop sensing means mounted on said implement for sensing the directional alignment of said implement and thereby causing actuation of said force means to maintain a desired alignment of said implement.

6. A guidance control as recited in claim 5 wherein said control further includes a pair of abutment members oppositely positioned on said tractor chassis to thereby provide horizontal and vertical stabilization for said one of said lever arms and said other of said lever arms is fixed to said pull link.

7. A guidance control as recited in claim 6 wherein said control circuit includes switch means that causes one of said hydraulic cylinders to extend and the other of said cylinders to retract simultaneously.

* * * * *